US011355329B2

(12) United States Patent
Ukai et al.

(10) Patent No.: US 11,355,329 B2
(45) Date of Patent: Jun. 7, 2022

(54) MASS SPECTROMETER AND MASS SPECTROMETRIC METHOD

(71) Applicant: SHIMADZU CORPORATION, Kyoto (JP)

(72) Inventors: Kazuya Ukai, Kyoto (JP); Yuji Katsuyama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/265,969

(22) PCT Filed: Sep. 21, 2018

(86) PCT No.: PCT/JP2018/035197
§ 371 (c)(1),
(2) Date: Feb. 4, 2021

(87) PCT Pub. No.: WO2020/059144
PCT Pub. Date: Mar. 26, 2020

(65) Prior Publication Data
US 2021/0296105 A1    Sep. 23, 2021

(51) Int. Cl.
*H01J 49/00* (2006.01)
*G01N 30/72* (2006.01)
*G01N 30/02* (2006.01)

(52) U.S. Cl.
CPC ...... *H01J 49/0036* (2013.01); *G01N 30/7233* (2013.01); *H01J 49/005* (2013.01); *G01N 2030/027* (2013.01)

(58) Field of Classification Search
CPC ...... H01J 49/0036; H01J 49/005; H01J 49/42; G01N 30/7233; G01N 2030/027; G01N 27/62
(Continued)

(56) References Cited

U.S. PATENT DOCUMENTS

2020/0035479 A1* 1/2020 Yasuda .................. G01N 30/02

FOREIGN PATENT DOCUMENTS

JP    2017-20877 A    1/2017

OTHER PUBLICATIONS

International Search Report for PCT/JP2018/035197 dated Dec. 11, 2018 (PCT/ISA/210).
(Continued)

*Primary Examiner* — Michael Maskell
(74) *Attorney, Agent, or Firm* — Sughrue Mion, PLLC

(57) ABSTRACT

Provided is a mass spectrometer including: a measurement condition setter (42) configured to set a plurality of measurement conditions which are different from each other in terms of the set value of at least one measurement parameter; a measurement executer (43) configured to acquire a plurality of sets of mass spectrometric data respectively corresponding to the plurality of measurement conditions; a product ion extractor (44) configured to extract product ions detected with intensities exceeding a previously determined reference value; an MRM spectrum element information creator (45) configured to determine the mass-to-charge ratios and measured intensities of the extracted product ions, the mass-to-charge ratio of the precursor ion, as well as the measurement condition, and to create a plurality of pieces of MRM spectrum element information; an MRM spectrum composer (46) configured to compose an MRM spectrum from the mass-to-charge ratios and the measured intensities of the product ions included in the plurality of pieces of MRM spectrum element information; and a library data creator (47) configured to relate the MRM spectrum to information concerning the target compound to create library data for the target compound.

13 Claims, 11 Drawing Sheets

(58) Field of Classification Search
USPC .......................................... 250/281, 282, 288
See application file for complete search history.

(56) References Cited

OTHER PUBLICATIONS

Written Opinion of the International Searching Authority for PCT/JP2018/035197 dated Dec. 11, 2018 (PCT/ISA/237).
Communication dated Jan. 5, 2022, issued by the Japanese Patent Office in application No. 2020-547601.

* cited by examiner

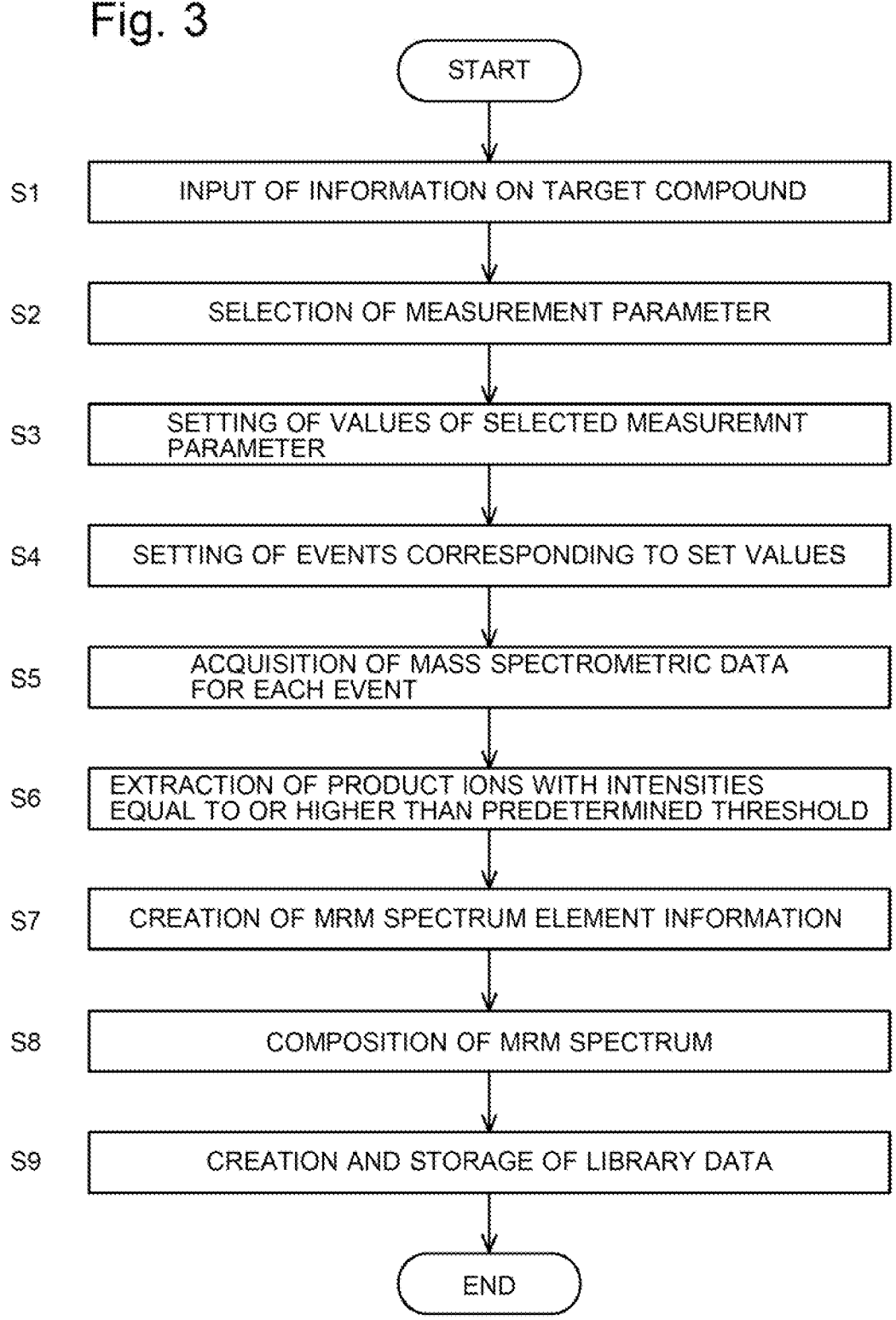

Fig. 4

| Event | Parameter A | Parameter B | CE | ... | Parameter Y | Parameter Z |
|---|---|---|---|---|---|---|
| 1 | Initial Value A | Initial Value B | 10V | ... | Initial Value Y | Initial Value Z |
| 2 | Initial Value A | Initial Value B | 15V | ... | Initial Value Y | Initial Value Z |
| 3 | Initial Value A | Initial Value B | 20V | ... | Initial Value Y | Initial Value Z |
| ... | ... | ... | ... | ... | ... | ... |
| 6 | Initial Value A | Initial Value B | 35V | ... | Initial Value Y | Initial Value Z |
| ... | ... | ... | ... | ... | ... | ... |
| 9 | Initial Value A | Initial Value B | 50V | ... | Initial Value Y | Initial Value Z |

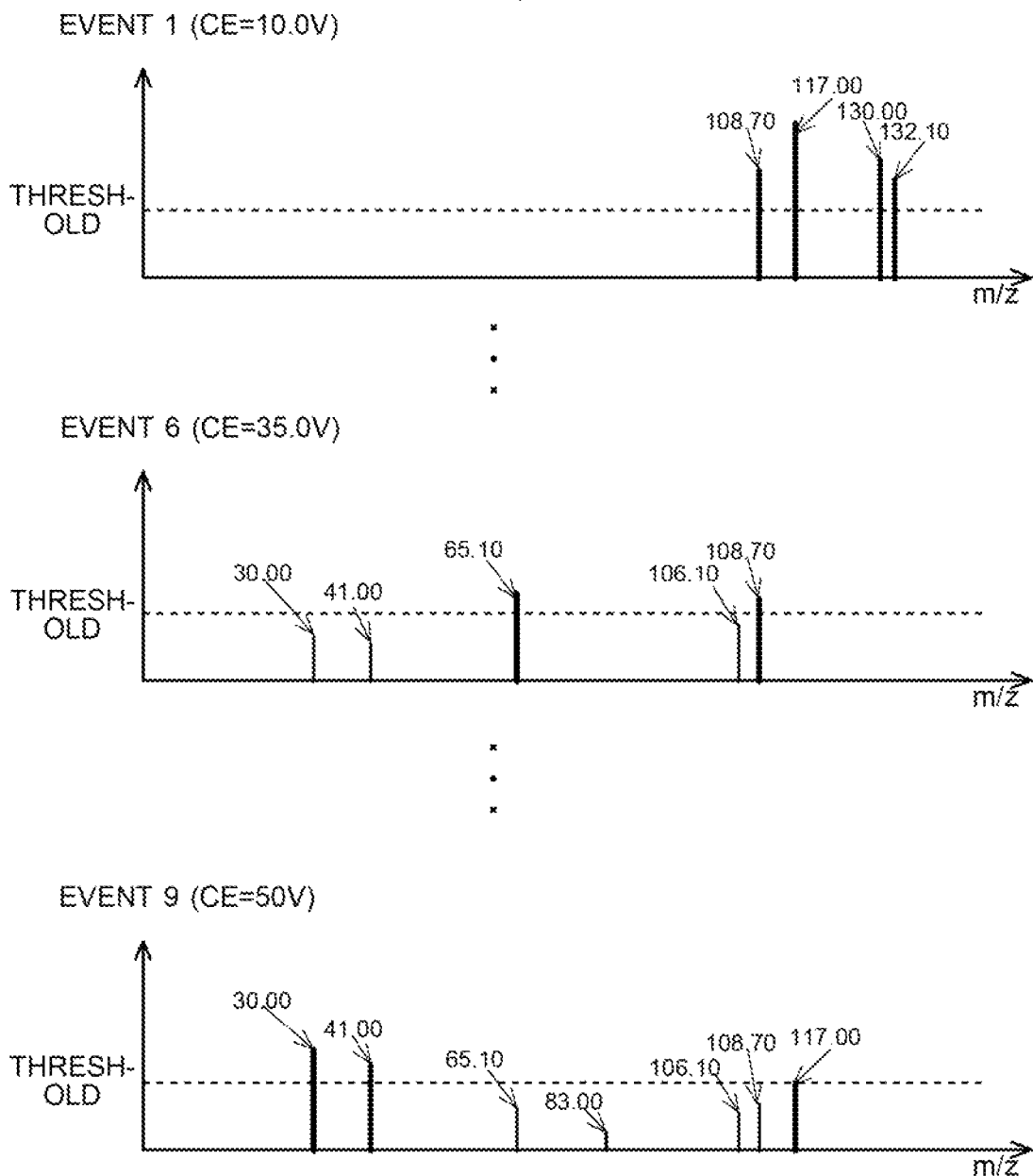

| m/z | Event 1 | ... | Event 6 | ... | Event 9 |
|---|---|---|---|---|---|
| 30.00 |  | ... | 75 | ... | 150 |
| 41.00 |  | ... | 60 | ... | 130 |
| 65.10 |  | ... | 125 | ... | 65 |
| 83.00 |  | ... |  | ... | 25 |
| 106.10 |  | ... | 80 | ... | 60 |
| 108.70 | 165 | ... | 125 | ... | 70 |
| 117.00 | 230 | ... |  | ... | 105 |
| 130.00 | 175 | ... |  | ... |  |
| 132.10 | 150 | ... |  | ... |  |

| Order of Priority | MRM Transition | | Event No. |
|---|---|---|---|
|  | Precursor Ion m/z | Product Ion m/z |  |
| 1 | 195.00 | 117.00 | Event 1(CE:10V) |
| 2 | 195.00 | 130.00 | Event 2(CE:15V) |
| 3 | 195.00 | 108.70 | Event 1(CE:10V) |
| 4 | 195.00 | 83.00 | Event 4(CE:25V) |
| 5 | 195.00 | 30.00 | Event 9(CE:50V) |
| 6 | 195.00 | 132.10 | Event 1(CE:10V) |
| 7 | 195.00 | 41.00 | Event 9(CE:50V) |
| 8 | 195.00 | 65.10 | Event 6(CE:35V) |

Fig. 9

| No. | MRM Transition | |
|---|---|---|
| | Precursor Ion m/z | Product Ion m/z |
| 1 | 195.00 | 117.00 |
| 2 | 195.00 | 130.00 |
| 3 | 195.00 | 108.70 |
| 4 | 195.00 | 83.00 |
| 5 | 195.00 | 30.00 |
| 6 | 195.00 | 132.10 |
| 7 | 195.00 | 41.00 |
| 8 | 195.00 | 65.10 |

| Event | Compound Name | Execution Period | Number of Channels |
|---|---|---|---|
| 1 | Compound A | 0.00-5.00 | 8 |
| 2 | Compound B | 0.00-5.00 | 15 |
| 3 | Compound C | 3.00-7.00 | 15 |
| 4 | Compound D | 4.00-7.00 | 18 |
| ... | ... | ... | ... |
| 100 | Compound X | 25.00-30.00 | 15 |

| Channel | MRM Transition | | CE (V) |
|---|---|---|---|
| | Precursor Ion m/z | Product Ion m/z | |
| 1 | 195.00 | 117.00 | 10 |
| 2 | 195.00 | 130.00 | 15 |
| 3 | 195.00 | 108.70 | 10 |
| 4 | 195.00 | 83.00 | 25 |
| 5 | 195.00 | 30.00 | 50 |
| 6 | 195.00 | 132.10 | 10 |
| 7 | 195.00 | 41.00 | 50 |
| 8 | 195.00 | 65.10 | 35 |

MASS SPECTROMETER AND MASS SPECTROMETRIC METHOD

CROSS REFERENCE TO RELATED APPLICATIONS

This application is a National Stage of International Application No. PCT/JP2018/035197 filed Sep. 21, 2018.

TECHNICAL FIELD

The present invention relates to a mass spectrometer capable of performing an MS$^n$ analysis (where n is an integer equal to or greater than two), and a mass spectrometric method using such a type of mass spectrometer.

BACKGROUND ART

Chromatograph mass spectrometers have been widely used for identifying and quantitatively determining target compounds contained in a sample, such as agricultural chemicals contained in a food product. A multiple reaction monitoring (MRM) method has been commonly known as a method for identifying and quantitatively determining target compounds in a sample using a chromatograph mass spectrometer. For an MRM measurement, a mass spectrometer is used which includes a front mass-separating section configured to select a precursor ion, a fragmenting section configured to fragment the precursor ion selected by the front mass-separating section to generate product ions, and a rear mass-separating section configured to perform mass separation of the product ions generated by the fragmenting section (for example, a triple quadrupole mass spectrometer having two quadrupole mass filters placed before and after a collision cell).

For the identification and quantitative determination of target compounds by an MRM measurement, two kinds of MRM transitions should be previously determined for each target compound: a target MRM transition and a qualifier MRM transition. An MRM transition is the combination of a precursor ion generated from a target compound and a product ion resulting from the fragmentation of the precursor ion. In many cases, an MRM transition including a product ion that is detected with the highest sensitivity is used as the target MRM transition, while an MRM transition including a product ion that is detected with the second highest sensitivity is used as the qualifier MRM transition. For a compound isolated by a column in a chromatograph, the intensity of the product ion of the target MRM transition and that of the product ion of the qualifier MRM transition are each measured to obtain a mass chromatogram for each of those MRM transitions. The quantity of the target compound is determined from the peak area (or peak height) of the mass chromatogram of the target MRM transition, while the fact that the peak on the mass chromatogram has originated from the target compound is confirmed (identification) by calculating the ratio of the peak area (or peak height) of the mass chromatogram of the target MRM transition and that of the mass chromatogram of the qualifier MRM transition, as well as comparing this ratio with a ratio previously determined through the MRM measurement of a standard sample (for example, see Patent Literature 1).

Food products, biological metabolites and other similar types of samples contain a wide variety of compounds other than the target compounds (foreign compounds). In some cases, the target compounds cannot be sufficiently separated from foreign compounds by the column in the chromatograph. Furthermore, those foreign compounds may possibly include previously unexpectable kinds of compounds. If there is a foreign compound which is eluted from the column at a point in time (retention time) at which a target compound is also eluted, and if the foreign compound also produces the product ion of the target MRM transition or qualifier MRM transition, the product ion from the foreign compound will also be included in the measurement along with the product ion from the target compound. This may consequently lead to an incorrect determination that the target compound is contained in the sample despite the fact that this compound is not actually contained (such a determination is called a "false positive"), or it may cause the determined quantity to be larger than the actual content of the target compound.

In order to avoid a false positive and improve the reliability of the identification and quantitative determination for target compounds, an additional measurement has conventionally been performed in addition to the MRM measurement as follows: An MRM measurement using one MRM transition is repeatedly performed as one "survey event" during a period of time in which a target compound isolated by the column of the chromatograph is eluted from the column (retention period; FIG. 1A). When the intensity of the product ion in the MRM measurement has exceeded a previously determined threshold, another measurement related to the MRM measurement ("dependent event") is triggered. In the dependent event, a product-ion scan measurement is performed under each of a plurality of measurement conditions which are different from each other in terms of the amount of energy (collision energy) imparted to the ions to be introduced into the collision cell. The measurement parameter for changing the amount of collision energy is the value of the offset voltage applied to the ion guide within the collision cell. An offset voltage whose polarity is opposite to that of the precursor ion is applied to the ion guide within the collision cell to impart collision energy to the precursor ion, and the level of this offset voltage is changed to vary the amount of collision energy to be imparted to the precursor ion.

The reason for performing the product-ion scan measurement at multiple levels of collision energy is due to the fact that the form of the fragmentation of the precursor ion changes depending on the amount of collision energy, and the optimum collision energy (which yields a high level of sensitivity) changes for each product ion. Performing the product-ion scan measurement at multiple levels of collision energy in the previously described manner prevents omission of the detection of a characteristic product ion generated from the target compound. The collision energy mentioned to this point is a typical example of the measurement parameter for changing the form of the fragmentation of the precursor ion. Other examples include the kind or pressure of the gas to be introduced into the collision cell. In some cases, the product-ion scan measurement is performed under multiple measurement conditions which are different from each other in terms of not only a measurement parameter that changes the form of the fragmentation of the precursor ion but also a measurement parameter that changes the measurement sensitivity for the product ions (e.g., a voltage value applied to the front mass-separating section or rear mass-separating section).

During the retention period for a target compound, an MRM measurement as the survey event and a plurality of product-ion scan measurements as the dependent event form one cycle of measurements and are repeatedly performed. After the completion of the measurement, the product-ion spectra (FIG. 1B) respectively obtained through the plurality of product-ion scan measurements are synthesized into a measured synthetic product-ion spectrum (FIG. 1C). The mass peaks of a plurality of product ions characteristic of the target compound are present on the measured synthetic product-ion spectrum. The positions (mass-to-charge ratios) and intensities of the located mass peaks are compared with those of the mass peaks of the product ions on a standard synthetic product-ion spectrum for the target compound prepared beforehand by performing a measurement of a standard sample of the target compound under the same condition. Synthetic product-ion spectrums normally have mass peaks which respectively correspond to a plurality of product ions characteristic of the target compound. Accordingly, by comparing those mass peaks, the target compound can be selected (screened), whereby the false positive can be avoided.

CITATION LIST

Patent Literature

Patent Literature 1: JP 2017-020877 A

SUMMARY OF INVENTION

Technical Problem

In the product-ion scan measurement, the voltage value applied to the rear mass-separating section is gradually changed to continuously vary the mass-to-charge ratio at which product ions are allowed to pass through the rear mass-separating section. For example, in the case of performing a product-ion scan measurement under a typical measurement condition in which the mass-to-charge ratio is changed over a measurement range of 100 to 1000 in steps of 0.1, the value of the voltage applied to the rear mass-separating section is changed 9000 times in a stepwise manner, and the intensity of the product ion is measured in each step. Thus, in the product-ion scan measurement, the intensity of the product ion needs to be measured in each of the large number of steps, so that one execution of the measurement requires a considerable amount of time. Performing one cycle of measurements requires an even longer length of time since such a product-ion scan measurement must be performed under a plurality of measurement conditions with different levels of collision energy, as described earlier. The loop time, which is the period of time required for one cycle of measurements, determines the intervals of time at which MRM measurement data are acquired. Accordingly, a long loop time leads to an insufficient number of data points forming a peak on a mass chromatogram, making it impossible to obtain a correct form of the peak. Consequently, although a positive false can be avoided, the conventional mass spectrometry has a low level of quantitative determination accuracy as well as exhibits a low level of performance in reproducing the form of a peak on a chromatogram.

The problem to be solved by the present invention is to provide a technique by which the screening of a target compound can be achieved with a shorter loop time than by the conventional technique, using a mass spectrometer capable of performing an MS$^n$ analysis including a front mass-separating section configured to select a precursor ion, a fragmenting section configured to fragment the precursor ion to generate product ions, and a rear mass-separating section configured to perform mass separation of the product ions.

Solution to Problem

The first aspect of the present invention developed for solving the previously described problem is a mass spectrometric method using a mass spectrometer including a front mass-separating section configured to select, as a precursor ion, an ion having a predetermined mass-to-charge ratio among ions originating from a compound contained in a sample, a fragmenting section configured to fragment the precursor ion selected by the front mass-separating section to generate product ions, and a rear mass-separating section configured to perform mass separation of the product ions generated by the fragmenting section, the method including:

introducing a standard sample containing a known target compound into the mass spectrometer;

setting a plurality of measurement conditions which are different from each other in terms of the set value of at least one measurement parameter that changes the form of the fragmentation of the precursor ion in the fragmenting section or that changes the measurement sensitivity for the product ions;

acquiring a plurality of sets of mass spectrometric data respectively corresponding to the plurality of measurement conditions, by performing a measurement of product ions using each of the plurality of measurement conditions, where the measurement includes fragmenting a precursor ion having a predetermined mass-to-charge ratio of the target compound into product ions and performing mass separation of the product ions;

extracting, from the sets of the mass spectrometric data, a plurality of product ions whose measured intensities exceed a previously determined reference value;

determining, for each of the plurality of extracted product ions, the mass-to-charge ratio and measured intensity of the product ion, the mass-to-charge ratio of the precursor ion which produced the product ion, as well as the measurement condition under which the measured intensity was acquired, and creating a plurality of pieces of MRM spectrum element information from the plurality of product ions and the measurement conditions respectively determined for the plurality of product ions;

composing an MRM spectrum from the mass-to-charge ratios and the measured intensities of the plurality of product ions included in the plurality of pieces of MRM spectrum element information; and relating the MRM spectrum to information concerning the target compound to create library data for the target compound.

The measurement method for acquiring the mass spectrometric data may be a product-ion scan measurement in which the intensities of product ions are measured while the mass-to-charge ratios of the product ions are scanned, with the mass-to-charge ratio of the precursor ion fixed, or an MRM measurement in which the intensity of a product ion is measured, with both the mass-to-charge ratio of the precursor ion and that of the product ion fixed. The former method can be used when the kinds of product ions to be generated from the target compound are unknown. The latter method can be used when the mass-to-charge ratio of a product ion to be generated from the target compound is previously known.

A typical example of the at least one measurement parameter is a measurement parameter that changes the amount of collision energy imparted to the precursor ion to be introduced into the fragmenting section. Other kinds of parameters are also available, such as the kind of collision gas to be introduced into the fragmenting section, or the voltage value applied to the front mass-separating section or rear mass-separating section.

In the mass spectrometric method according to the first aspect of the present invention, a plurality of measurement conditions are set for a mass spectrometric analysis of a standard sample containing a target compound. The measurement conditions are different from each other in terms of the set value of at least one measurement parameter that changes the form of the fragmentation of the precursor ion in the fragmenting section or that changes the measurement sensitivity for the product ions. A mass spectrometric analysis using each of those measurement conditions is performed to acquire a plurality of sets of mass spectrometric data (product-ion spectrum data or MRM measurement data) which respectively correspond to the plurality of measurement conditions. Subsequently, a plurality of product ions whose measured intensities exceed a previously determined reference value are extracted from the acquired mass spectrometric data. Then, the mass-to-charge ratio and measured intensity of the product ion, the mass-to-charge ratio of the precursor ion which has produced the product ion, as well as the measurement condition under which the measured intensity has been acquired are determined for each of the plurality of extracted product ions, and those pieces of information are related to each other to create a plurality of pieces of MRM spectrum element information. Each of those pieces of information indicates the combination of the mass-to-charge ratio of a precursor ion and that of a product ion (MRM transition) with which the measurement for the target compound can be performed with a level of intensity equal to or higher than the previously determined reference value, as well as specifies a suitable measurement condition for the MRM transition. Subsequently, an MRM spectrum is composed from the mass-to-charge ratios and measured intensities of the product ions included in the plurality of pieces of MRM spectrum element information. Unlike a normal type of product-ion spectrum acquired by a product-ion scan measurement, this MRM spectrum has peak data in a localized form only at the positions of the mass-to-charge ratios corresponding to the MRM transitions included in the MRM spectrum element information. Lastly, the MRM spectrum is related to information concerning the target compound to create library data for the target compound. The MRM spectrum in the library data contains the pieces of MRM spectrum element information which respectively correspond to the peaks in the MRM spectrum.

In a conventional case, a standard synthetic product-ion spectrum which is prepared beforehand, for example, by performing a measurement of a standard sample of the target compound is used as reference information in order to avoid a false positive in the screening of the target compound. To acquire a measured synthetic product-ion spectrum which is necessary when referring to the standard synthetic product-ion spectrum, a product-ion scan measurement must be performed under a plurality of measurement conditions, so that a significant amount of time is required for one cycle of measurements.

By comparison, the MRM spectrum data included in the library data for the target compound acquired by the mass spectrometric method according to the first aspect of the present invention is a set of data having peaks in a localized form only at the positions corresponding to a plurality of specific MRM transitions. Referring to such a form of data requires the measurement to be performed only for those MRM transitions under the corresponding measurement conditions. This eliminates the necessity of performing a time-consuming product-ion scan measurement as in the conventional method, so that the screening of the target compound can be performed with a shorter loop time. Furthermore, the mass spectrometric method according to the first aspect of the present invention can determine a suitable MRM transition for the MRM measurement of a target compound as well as a suitable measurement condition for the MRM transition simultaneously with the acquisition of an MRM spectrum for the target compound.

The number of pieces of the MRM spectrum element information, or the number of peaks in the MRM spectrum, should preferably be at least three, and more preferably, between six and sixteen, inclusive. The number of pieces of the MRM spectrum element information may be appropriately determined according to the molecular weight, molecular structure and other features of the target compound. Selecting a number within the aforementioned range allows a sufficient number of product ions characteristic of the target compound to be used for comparison with the measured data. It also allows the dwell time (the length of time required for the measurement of the product ions under one measurement condition) to be long enough without causing the cycle time in the actual measurement to be excessively long.

The second aspect of the present invention developed for solving the previously described problem is a mass spectrometer capable of performing an $MS^n$ analysis (where n is an integer equal to or greater than two) including a front mass-separating section configured to select, as a precursor ion, an ion having a predetermined mass-to-charge ratio among ions originating from a compound contained in a sample, a fragmenting section configured to fragment the precursor ion selected by the front mass-separating section to generate product ions, and a rear mass-separating section configured to perform mass separation of the product ions generated by the fragmenting section, the mass spectrometer further including:

a measurement condition setter configured to set, in response to an input of an instruction by a user, a plurality of measurement conditions which are different from each other in terms of the set value of at least one measurement parameter that changes the form of the fragmentation of the precursor ion in the fragmenting section or that changes the measurement sensitivity for the product ions;

a measurement executer configured to acquire a plurality of sets of mass spectrometric data respectively corresponding to the plurality of measurement conditions, by performing a measurement of product ions using each of the plurality of measurement conditions, where the measurement includes fragmenting a precursor ion having a predetermined mass-to-charge ratio of the target compound into product ions and performing mass separation of the product ions;

a product ion extractor configured to extract, from the sets of the mass spectrometric data, a plurality of product ions whose measured intensities exceed a previously determined reference value;

an MRM spectrum element information creator configured to determine, for each of the plurality of extracted product ions, the mass-to-charge ratio and measured intensity of the product ion, the mass-to-charge ratio of the precursor ion which produced the product ion, as well as the measurement condition under which the measured intensity was acquired, and to create a plurality of pieces of MRM spectrum element information from the plurality of product ions and the measurement conditions respectively determined for the plurality of product ions;

an MRM spectrum composer configured to compose an MRM spectrum from the mass-to-charge ratios and the measured intensities of the plurality of product ions included in the plurality of pieces of MRM spectrum element information; and a library data creator configured to relate the MRM spectrum to information concerning the target compound to create library data for the target compound.

Advantageous Effects of Invention

By using the mass spectrometer or mass spectrometric method according to the present invention, the screening of a target compound can be performed with a shorter loop time than by the conventional technique.

BRIEF DESCRIPTION OF DRAWINGS

FIG. 3 is a flowchart for creating library data for a target compound using the chromatograph mass spectrometer according to the present embodiment.

FIG. 4 is an example of the method file used in the process of creating library data for a target compound by the chromatograph mass spectrometer according to the present embodiment.

FIG. 5 is an example of the product-ion spectra acquired by the chromatograph mass spectrometer according to the present embodiment.

FIG. 9 shows MRM transitions related to compound A.

DESCRIPTION OF EMBODIMENTS

Figure 1A:
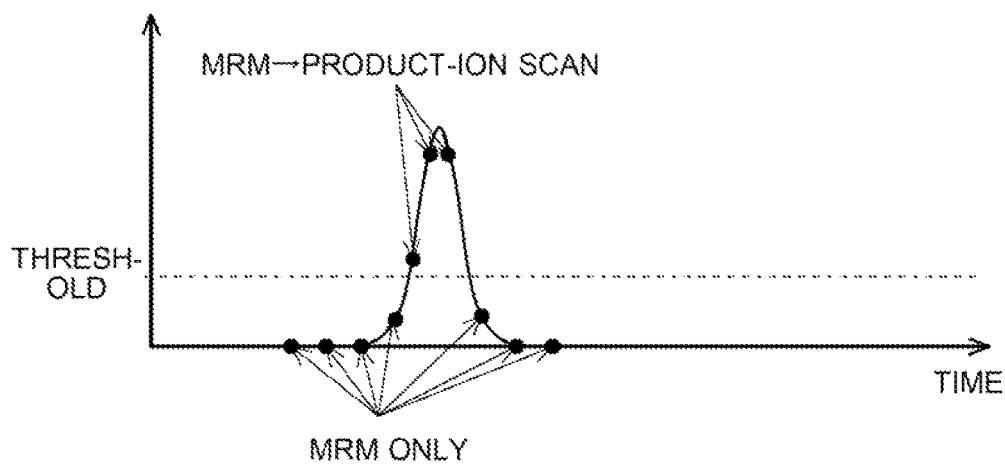
FIGS. 1A-1C are diagrams illustrating an additional measurement which has been conventionally performed.
Figure 1B:
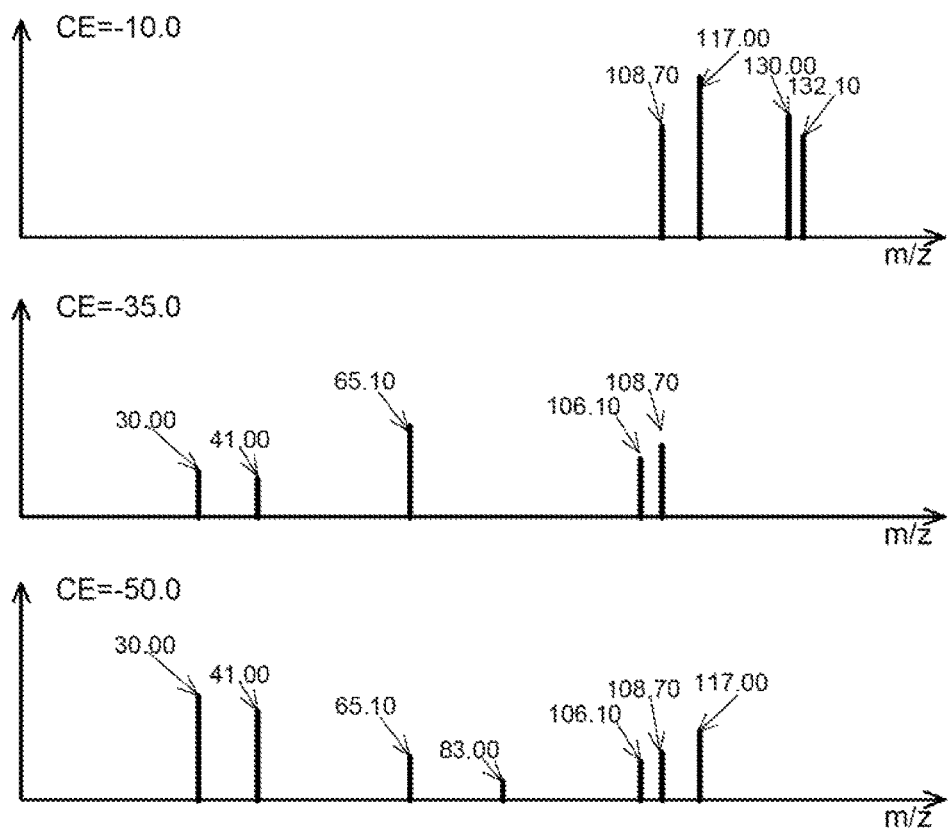
Figure 1C:
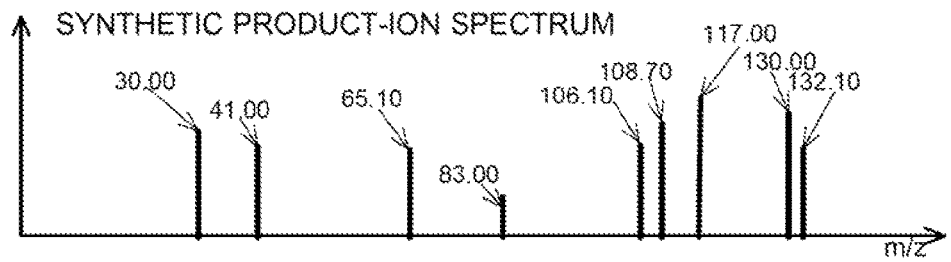
Figure 2:
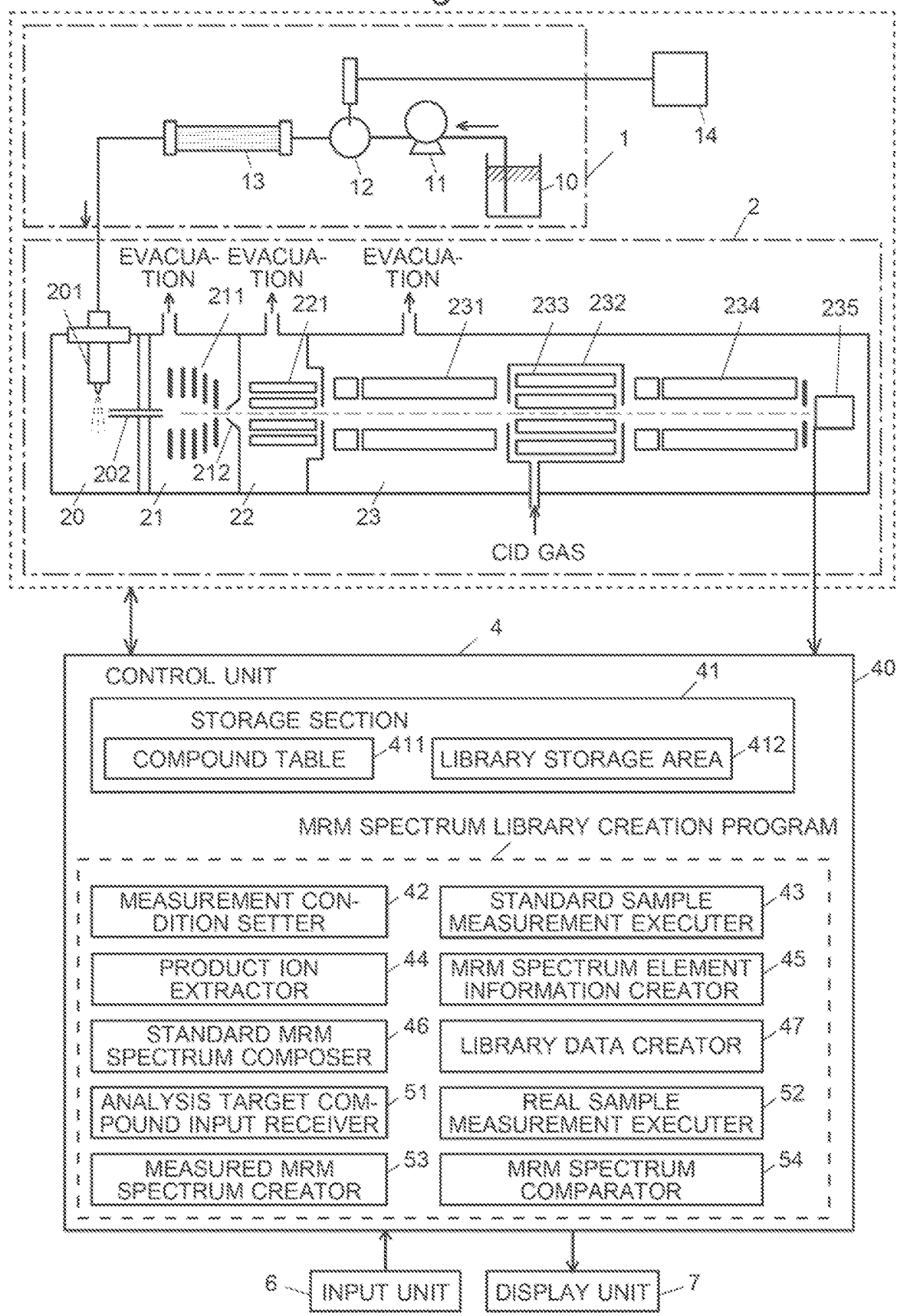
FIG. 2 is a configuration diagram showing the main components of a liquid chromatograph mass spectrometer in which one embodiment of a mass spectrometer according to the present invention is coupled with a liquid chromatograph.

An embodiment of the mass spectrometer and mass spectrometric method according to the present invention is hereinafter described with reference to the drawings. FIG. 2 is a configuration diagram showing the main components of a liquid chromatograph mass spectrometer in which the mass spectrometer according to the present embodiment is coupled with a liquid chromatograph.

The liquid chromatograph mass spectrometer according to the present embodiment is roughly divided into a liquid chromatograph unit 1, a mass spectrometry unit 2, and a control unit 4 configured to control the operations of those units. The liquid chromatograph unit 1 includes a mobile phase container 10 in which a mobile phase is stored, a pump 11 configured to draw the mobile phase and supply it at a constant flow rate, an injector 12 configured to inject a predetermined amount of sample solution into the mobile phase, and a column 13 configured to temporally separate various compounds contained in the sample solution. An autosampler 14 configured to individually introduce a plurality of liquid samples into the injector 12 is connected to the liquid chromatograph unit 1.

The mass spectrometry unit 2 is configured as a multistage differential pumping system including an ionization chamber 20 maintained at substantially atmospheric pressure and an analysis chamber 23 evacuated to a high degree of vacuum by a vacuum pump (not shown), between which first and second intermediate vacuum chambers 21 and 22 are provided having their degrees of vacuum increased in a stepwise manner. The ionization chamber 20 has an electrospray ionization probe (ESI probe) 201 configured to spray a sample solution while imparting electric charges to the sample solution. The ionization chamber 20 has an electrospray ionization probe (ESI probe) 201 configured to spray a sample solution while imparting electric charges to the sample solution. The ionization chamber 20 and the first intermediate vacuum chamber 22 in the subsequent stage communicate with each other through a thin heated capillary 202. The first intermediate vacuum chamber 21 is separated from the second intermediate vacuum chamber 22 by a skimmer 212 having a small hole at its apex. Ion guides 211 and 221 configured to transport ions to the subsequent stage while converging them are respectively placed within the first and second intermediate vacuum chambers 21 and 22. The analysis chamber 23 contains a front quadrupole mass filter (Q1) 231, a collision cell 232 with a multipole ion guide (q2) 233 placed inside, a rear quadrupole mass filter (Q3) 234, and an ion detector 235 arranged in series from the upstream side (i.e., from the side facing the ionization chamber 20). Collision-induced dissociation (CID) gas, such as argon or nitrogen, is appropriately supplied into the collision cell 232 according to the measurement conditions.

The mass spectrometry unit 2 is capable of various types of measurements, such as a selected ion monitoring (SIM) measurement, MS/MS scan measurement (product-ion scan measurement or precursor-ion scan measurement), or multiple reaction monitoring (MRM) measurement. In the SIM measurement, ions are detected in such a manner that no selection of ions is performed by the front quadrupole mass filter (Q1) 231 (this filter is not enabled to function as a mass filter) while the mass-to-charge ratio at which ions are allowed to pass through the rear quadrupole mass filter (Q3) is fixed.

In the product-ion scan measurement, while the mass-to-charge ratio at which a precursor ion is allowed to pass through the front quadruple mass filter (Q1) 231 is fixed, the rear quadrupole mass filter (Q3) 234 is operated to continuously vary the mass-to-charge ratio at which product ions are allowed to pass through, and the product ions which have passed through the rear quadrupole mass filter (Q3) 234 are detected. In the MRM measurement, both the mass-tocharge ratio at which a precursor ion is allowed to pass through the front quadrupole mass filter (Q1) 231 and the mass-to-charge ratio at which a product ion is allowed to pass through the rear quadrupole mass filter (Q3) 234 are fixed, and the product ion which has passed through the rear quadrupole mass filter (Q3) 234 is detected. In the precursor-ion scan measurement, while the front quadrupole mass filter (Q3) 231 is operated to continuously vary the mass-to-charge ratio at which precursor ions are allowed to pass through, the mass-to-charge ratio at which a product ion is allowed to pass through the rear quadrupole mass filter (Q3) 234 is fixed, and the product ion which has passed through the rear quadrupole mass filter (Q3) 234 is detected. In any of these types of measurements, CID gas is supplied into the collision cell 232 in order to fragment the precursor ion and generate product ions.

The control unit 4 has a storage section 41 and also includes, as its functional blocks, a measurement condition setter 42, standard sample measurement executer 43, product ion extractor 44, MRM spectrum element information creator 45, standard MRM spectrum composer 46, library data creator 47, analysis target compound input receiver 51, real sample measurement executer 52, measured MRM spectrum creator 53, and MRM spectrum comparator 54. The control unit 4 is actually a personal computer with a processor realizing the aforementioned functional blocks by running an MRM spectrum library creation program previously installed on the same computer. An input unit 6 and display unit 7 are connected to the control unit 4.

The storage section 41 holds a compound table 411 describing items of information concerning a plurality of compounds, such as the name, chemical formula, molecular weight, and CAS Registry Number® of the compound, as well as the mass-to-charge ratio of the precursor ion and the retention time in the case of performing component separation by the column 13. A library storage area 412 is provided in the storage section 41 for storing MRM spectrum library data created through the process steps which will be described later.

A procedure for an analysis using a chromatograph mass spectrometer according to the present embodiment is hereinafter described with reference to the flowchart in FIG. 3. In the chromatograph mass spectrometer according to the present embodiment, a measurement of a standard sample containing a known target compound is performed to create MRM spectrum library data related to the target compound. The MRM spectrum library data prepared for each target compound is stored and accumulated in the library storage area 412. From those MRM spectrum library data, an MRM spectrum library is formed on the library storage area 412.

In response to a predetermined operation by a user, such as the execution of the MRM spectrum library creation program, the measurement condition setter 42 displays, on the display unit 7, a screen which allows the user to input information concerning the target compound. Specifically, the user is asked whether or not the target compound is already recorded in the compound table 411. If the target compound is a compound already recorded in the compound table 411, the user is prompted to select the target compound from the compound table 411. If the target compound is not recorded in the compound table 411, the measurement condition setter 42 displays a screen which allows the user to input the name, chemical formula and molecular weight of the target compound as well as the mass-to-charge ratio of the precursor ion. In the case where the user has inputted information concerning a compound which is not recorded in the compound table 411, the inputted information is added to the compound table 411. In the case where the target compound is ionized by an ESI probe 201 as in the present embodiment, the most abundantly generated ion is normally the molecular ion of the target compound. Accordingly, the value of the mass-to-charge ratio of the precursor ion may be computed from the molecular weight and automatically inputted. In the present embodiment, when the user has selected a compound recorded in the compound table 411, only the molecular ion of that compound is inputted as the precursor ion. If other types of precursor ions (e.g., adduct ion) are also recorded along with the molecular ion in the compound table 411, those ions may also be inputted as the precursor ions.

After the user has inputted the information concerning the target compound by selecting a target compound from the compound table 411 or inputting the name, chemical formula and molecular weight of the target compound as well as the mass-to-charge ratio of the precursor ion (Step S1), the measurement condition setter 42 subsequently displays a screen for setting measurement conditions for the target compound. This screen shows a plurality of measurement parameters included in the measurement conditions and allows the user to select a measurement parameter for which a plurality of values should be set (Step S2). When a measurement parameter has been selected by the user, the measurement condition setter 42 displays a screen for setting the values of the measurement parameter.

The following description of the present embodiment deals with an example in which the user selects the collision energy (CE) as the measurement parameter. When the collision energy is selected by the user as the measurement parameter for which a plurality of values should be set, the measurement condition setter 42 prompts the user to input the minimum value, maximum value and step width of the collision energy. For example, the following description of the present embodiment assumes that a minimum value of 10 V, maximum value of 50 V and step width of 5 V have been inputted for the collision energy. The measurement condition setter 42 sets a plurality of different values for the user-selected measurement parameter (collision energy) according the instructions inputted by the user (Step S3). Although the present description is based on the example in which the user is prompted to input the minimum value, maximum value and step width of the collision energy, a different method for setting a plurality of values may also be used; for example, the user may be prompted to directly input the values of the collision energy. The measurement parameters other than the user-selected one are given their respective initial values, to determine the setting of the plurality of measurement conditions. The measurement condition setter 42 sets a plurality of events so that a product-ion scan measurement will be performed using the determined measurement conditions sequentially (Step S4). In the present embodiment, nine events as shown in FIG. 4 are prepared. The measurement condition setter 42 further creates a method file describing those events and stores the file in the storage section 41.

If a plurality of precursor ions have been inputted in Step S1, a plurality of events with the corresponding measurement conditions are set for each precursor ion, and a method file describing those events is stored. If the user has selected two or more measurement parameters, the measurement condition setter 42 determines a plurality of measurement conditions corresponding to all possible combinations of the plurality of values to be set for those measurement parameters, sets a plurality of events corresponding to those measurement conditions, and creates a method file describing those events. Examples of the measurement parameters for which a plurality of values can be set (i.e., parameters that can be selected in Step S2) other than the collision energy include the kind or pressure of the collision gas to be introduced into the collision cell 232, the value of a voltage applied to the front quadrupole mass filter (Q1) 231 or rear quadrupole mass filter (Q3) 234 (i.e., a voltage value used for sensitivity adjustment, such as the voltage applied to pre-rod electrodes).

After the method file has been created, the standard sample measurement executer 43 displays a measurement-start button on the display unit 7. The user presses this button, whereupon the standard sample measurement executer 43 reads the method file from the storage section 41 and continuously introduces, from the injector 12, a predetermined amount of standard sample of the target compound which has been set beforehand in the autosampler 14. In this measurement, the column 13 functions as a simple passage which directly transports the sample to the ESI probe 201 without separating it into components.

The standard sample measurement executer 43 sequentially executes the plurality of events ("events 1 to 9" in the present embodiment) described in the method file, in step with the timing at which the standard sample arrives at the ESI probe 201, and performs a measurement of the product ions. Thus, mass spectrometric data (product-ion spectrum data) is acquired for each of the events (Step S5). Each mass spectrometric data is stored in the storage section 41. In the present embodiment, data of product-ion spectra as shown in FIG. 5 is obtained.

Figures 6, 7, 8:
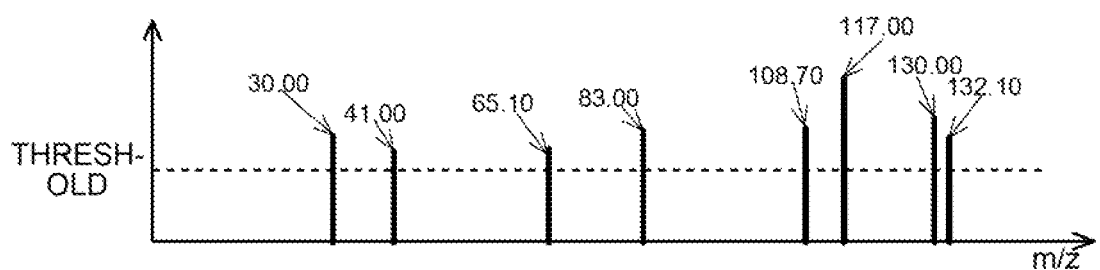
FIG. 6 is an example of the peak list acquired in the chromatograph mass spectrometer according to the present embodiment.
FIG. 7 is an example of the MRM spectrum element information acquired in the chromatograph mass spectrometer according to the present embodiment.
FIG. 8 is an example of the standard MRM spectrum acquired in the chromatograph mass spectrometer according to the present embodiment.

After the completion of the measurement, the product ion extractor 44 reads each product-ion spectrum data from the storage section 41 and extracts the data of the mass peaks. FIG. 6 shows a list of mass peaks extracted from the product-ion spectrum data acquired through each event (where the measured intensities are shown in arbitrary units). From this peak list, the product ion extractor 44 extracts mass peaks of product ions detected with intensities equal to or higher than a previously determined threshold (which is 100 in the present embodiment, in arbitrary units; Step S6).

For each of the extracted mass peaks, the MRM spectrum element information creator 45 subsequently creates MRM spectrum element information by relating the mass-to-charge ratio of the product ion, that of the precursor ion, and the event (measurement condition) through which the product-ion spectrum data was acquired (Step S7). If there are a plurality of events in which the measured intensity of a product ion having the same mass-to-charge ratio has exceeded the threshold, only the event (measurement condition) with the highest measured intensity is included in the MRM spectrum element information. Each MRM spectrum element information is prioritized in descending order of the measured intensity of the product ion and given a serial number indicating the order of priority. FIG. 7 shows the MRM spectrum element information obtained in the present embodiment. Thus, the suitable MRM transitions for the MRM measurement of the target compound and the suitable measurement conditions for the measurement using those MRM transitions are determined.

After the MRM spectrum element information has been created, the standard MRM spectrum composer 46 composes an MRM spectrum (standard MRM spectrum) from the mass-to-charge ratios and measured intensities of the product ions included in the MRM spectrum element information (Step S8). FIG. 8 shows the MRM spectrum created in the present embodiment. Unlike a normal type of product-ion spectrum acquired by a product-ion scan measurement, the MRM spectrum is a pseudo product-ion spectrum having data only at the positions of the mass peaks.

After the standard MRM spectrum has been composed, the library data creator 47 reads the name, chemical formula and retention-time information of the target compound from the compound table 411, combines the read information with the standard MRM spectrum to create library data for the target compound concerned, and stores the data in the library storage area 412 (Step S9). In this process, the standard MRM spectrum is normalized so that the peak with the highest measured intensity will have a predetermined intensity value (e.g., 1000). The standard MRM spectrum includes MRM spectrum element information (an MRM transition and a measurement condition for the MRM transition) related to each peak. By performing the previously described sequence of processes for a plurality of compounds, an MRM spectrum library is created in the library storage area 412.

The description thus far has been concerned with the case where a product-ion scan measurement is performed under a plurality of measurement conditions to acquire a plurality of sets of product-ion spectrum data and compose a standard MRM spectrum. If the combination of the mass-to-charge ratio of the precursor ion and that of the product ion (MRM transition) for the target compound is previously known, an MRM measurement using a plurality of measurement conditions may be performed to acquire MRM measurement data and create library data for the target compound.

In normal cases, if the MRM transition of the target compound is previously known, its information is present in the compound table. Accordingly, when inputting the information of the target compound, the user is prompted to additionally specify a plurality of MRM transitions to be used in the measurement. FIG. 9 shows an example (with eight MRM transitions). Although all MRM transitions in FIG. 9 include the same precursor ion, they may include MRM transitions with different precursor ions.

In the case of performing an MRM measurement, after the values of the measurement parameter(s) have been set in Step S3, a plurality of events respectively related to a plurality of measurement conditions are created for each MRM transition in Step S4. For example, if nine measurement conditions having different values of the collision energy have been inputted, a total of 72 events in which those nine measurement conditions are related to each of the eight MRM transitions are created.

The mass spectrometric data acquired for each event by performing the MRM measurement (measured intensity data of the product ions) corresponds to the peak list described with reference to FIG. 6. Accordingly, MRM spectrum element information can be created by the same processing as used for the peak list in FIG. 6, and a standard MRM spectrum can be composed from the MRM spectrum element information. Furthermore, the library data for the target compound can be created by combining this standard MRM spectrum with the name, chemical formula and retention-time information of the target compound.

In a conventional case, a standard synthetic product-ion spectrum which is prepared beforehand, for example, by performing a measurement of a standard sample of the target compound is used as reference information in order to avoid a false positive in the screening of the target compound. To acquire a measured synthetic product-ion spectrum which is necessary when referring to the standard synthetic product-ion spectrum, a product-ion scan measurement must be performed under a plurality of measurement conditions, so that a significant amount of time is required for one cycle of measurements.

On the other hand, the MRM spectrum data included in the library data for the target compound acquired by the mass spectrometer or mass spectrometric method according to the present embodiment is a set of data having peaks in a localized form only at the positions corresponding to a plurality of specific MRM transitions. A spectrum matching using such a form of data requires the measurement to be performed only for those MRM transitions under the measurement conditions respectively related to those MRM transitions. This eliminates the necessity of performing a time-consuming product-ion scan measurement as in the conventional method, so that the screening of the target compound can be performed with a shorter loop time.

Figure 10:
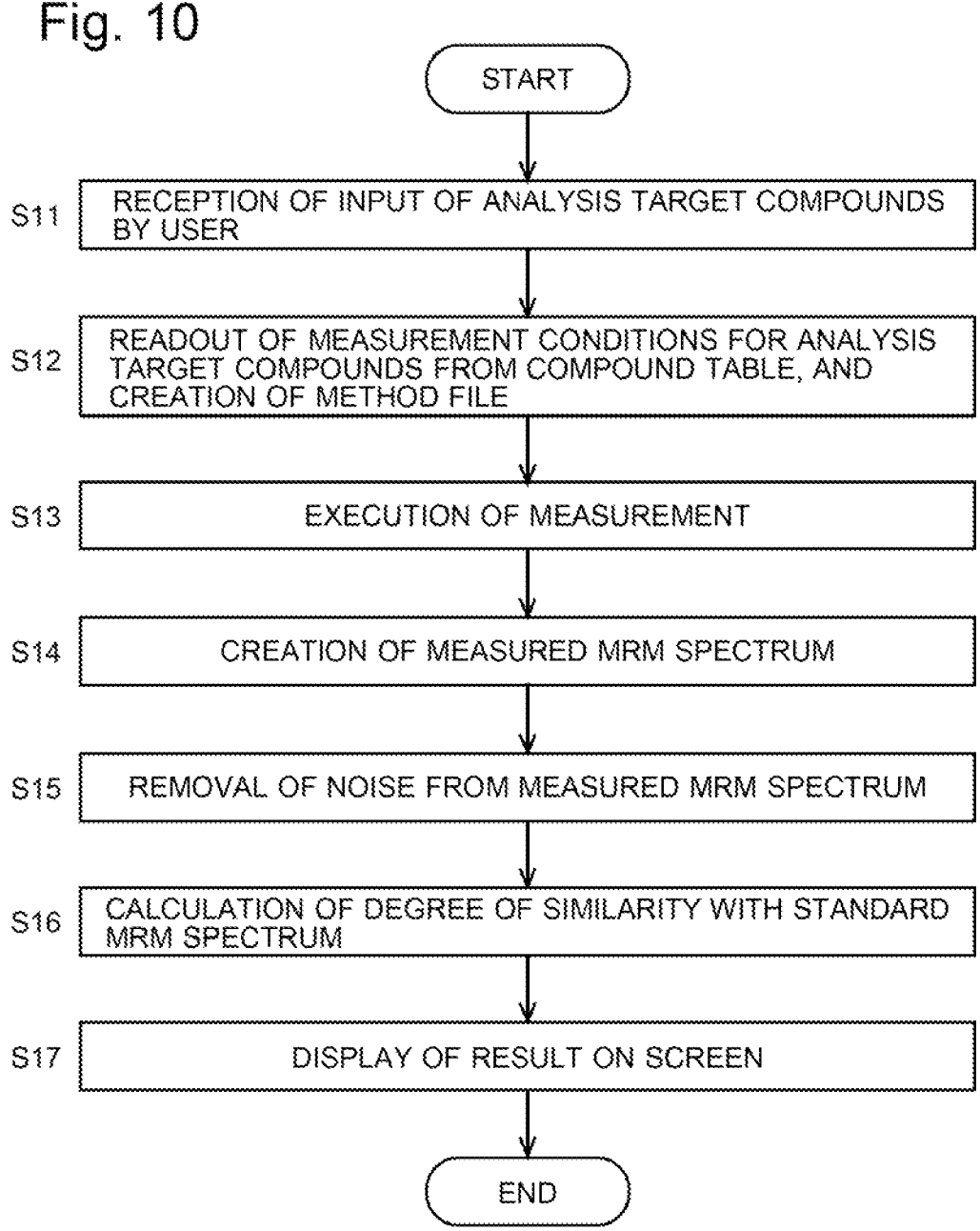
FIG. 10 is a flowchart for analyzing a real sample using the chromatograph mass spectrometer according to the present embodiment.

Next, the procedure for screening a target compound contained in a real sample using an MRM spectrum library created by the mass spectrometric method and mass spectrometer according to the present embodiment is described with reference to the flowchart in FIG. 10.

The user gives a command to initiate an analysis of a real sample, whereupon the analysis target compound input receiver 51 displays, on the display unit 7, a list of the compounds recorded in the MRM spectrum library stored in the library storage area 412, and prompts the used to select the target compound to be analyzed. The number of target compounds to be selected may be one or more. In selecting the target compounds, the user may specify the number of mass peaks to be used for the spectrum matching.

Figures 11A, 11B, 11C:
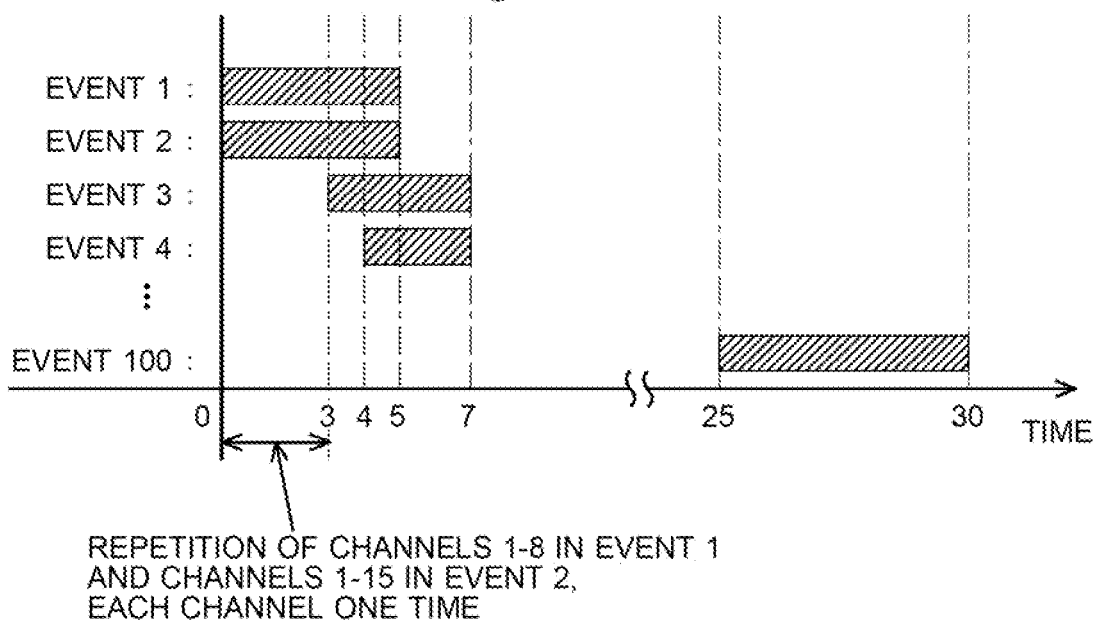
FIGS. 11A-11C illustrate a method file used in an analysis of a real sample using the chromatograph mass spectrometer according to the present embodiment.

After the target compounds (compounds A, B, C, D, . . . and X) have been selected by the user (Step S11), the real sample measurement executer 52 reads, from the MRM spectrum library, the retention time of each inputted compound as well as a plurality of MRM transitions related to the compound and the measurement condition of each MRM transition, to create a method file describing the read items of information (Step S12). As shown in FIGS. 11A and 11B, this method file describes one event for each compound and one channel for each of the MRM transitions of each compound. If the number of MRM transitions has been specified by the user in Step S11, the specified number of pieces of MRM spectrum element information are read in ascending order of their serial numbers (i.e., in descending order of the measured intensity in the standard MRM spectrum) from the MRM spectrum element information stored in the MRM spectrum library, and the channels for performing measurements of the MRM transitions corresponding to the read information are set.

As shown in FIGS. 11A-11C, the method file describes one event for each compound along with the execution period of the event (i.e., the period of time corresponding to the retention time of each compound). The configuration of the events is displayed on the display unit 7. When one event (compound) is selected on the event list displayed as shown in FIG. 11A, the channels which have been set for the event are listed as shown in FIG. 11B. One channel is provided for each MRM transition, and each channel is related to a measurement condition including an optimum value of the collision energy (which yields the highest measurement sensitivity) for the channel. Thus, the same number (100) of events as the target compounds inputted by the user are set in the method file, and each event is related to a set of channels whose number is equal to either the number of pieces of the MRM spectrum element information recorded in the MRM spectrum library for the compound corresponding to the event, or the number specified by the user (the number of mass peaks to be used for the spectrum matching).

When a user has given a command to initiate the measurement, the real sample measurement executer 52 injects, into the injector 12, a real sample which has been set in the autosampler 14 beforehand. The various components contained in the real sample introduced into the injector 12 are separated from each other by the column 13 and sequentially introduced into the ESI probe 201. Each component introduced into the ESI probe 201 is sprayed into and ionized within the ionization chamber 20. The resulting ions are introduced into the mass spectrometry unit 2 in the subsequent stage.

This measurement is performed according to the measurement conditions described in the method file, in which each of the compounds is sequentially subjected to the measurement using the plurality of channels (MRM transitions) defined in the event which is set for the compound concerned (Step S13). Within a period of time in which there are two or more events whose execution periods overlap each other, the plurality of channels defined in those events are sequentially and repeatedly executed. For example, in the case of the method file shown in FIGS. 11A-11C, the intensities of the product ions are repeatedly measured using the MRM transitions (channels 1-8) specified for compound A (event 1) as well as the MRM transitions (channels 1-15) specified for compound B (event 2) from the beginning of the measurement until three minutes have elapsed. During a period of 3 to 4 minutes after the beginning of the measurement, the intensities of the product ions are repeatedly measured using the MRM transitions specified for compounds A, B and C (FIG. 11C). The same also applies in the subsequent periods of time.

The measurement data acquired in this manner is sequentially stored in the storage section 41. It should be noted that the real sample measurement executer 52 additionally measures the intensities of the product ions a plurality of times using the MRM transition of each channel before and/or after the period of time specified as the measurement time of each event. The data additionally acquired outside the measurement time of each event are separately stored in the storage section 41 apart from the data acquired within the measurement time of the event.

After the completion of the measurement, the measured MRM spectrum creator 53 creates a measured MRM spectrum in which the intensities of the product ions measured within the measurement time through the channels in each event are shown as mass peaks (Step S14). Furthermore, the measured MRM spectrum creator 53 performs a subtracting operation in which the intensity of each product ion measured outside the execution time through the same channel in the same event (this intensity corresponds to the measurement noise) is subtracted from the measured intensity in the measured MRM spectrum, to create a measured MRM spectrum with the measurement noise removed (Step S15).

Figure 12:
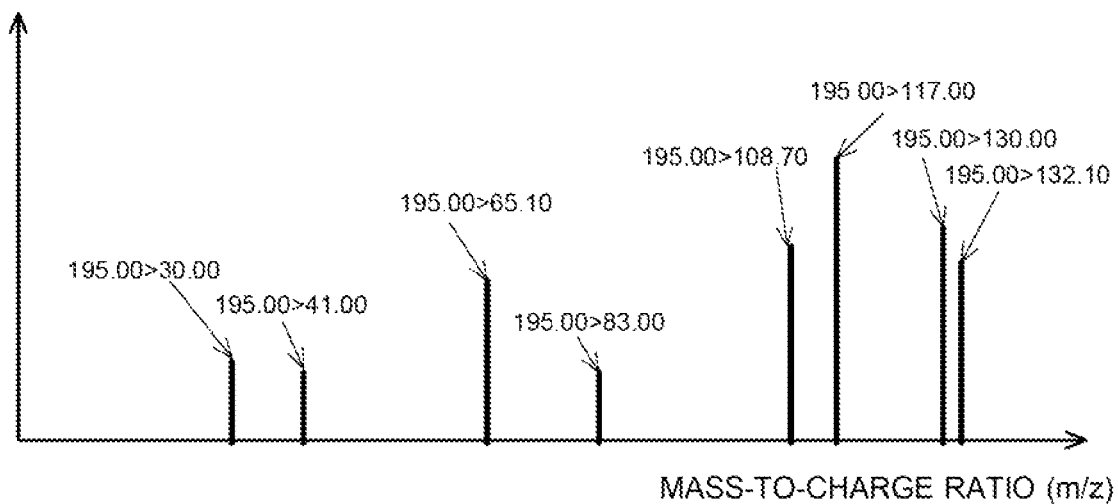
FIG. 12 is an example of the measured MRM spectrum acquired by an analysis of a real sample using the chromatograph mass spectrometer according to the present embodiment.

FIG. 12 shows an example of the measured MRM spectrum for compound A created in this manner. This spectrum has eight mass peaks which respectively correspond to the eight MRM transitions (channels) specified for compound A. Thus, the chromatograph mass spectrometer according to the present embodiment obtains a pseudo product-ion spectrum by performing a measurement using a plurality of MRM transitions. In the multi-measured MRM spectrum in the present embodiment, mass peaks of the product ions derived from different precursor ions are displayed as a single pseudo product-ion spectrum.

After the measured MRM spectra for all target compounds have been acquired, the MRM spectrum comparator 54 reads the MRM spectrum (standard MRM spectrum) of each compound from the MRM spectrum library and determines their degree of similarity. For the calculation of the degree of similarity, the measured MRM spectrum is initially normalized. This normalization is performed by the same method as used for the normalization of the MRM spectra stored in the MRM spectrum library. In the present embodiment, the normalization is performed so that the highest mass peak in the measured MRM spectrum has a predetermined intensity value (1000). After the normalization of the measured MRM spectrum, the measured intensities of the mass peaks are compared with those of the corresponding mass peaks of the standard MRM spectrum, and the degree of similarity is determined based on their differences (spectrum matching; Step S16). Although the degree of similarity between the measured and standard MRM spectra is calculated in the present example, the task of comparing those MRM spectra can be performed in various forms, such as the creation of a table comparing the mass-to-charge ratios and intensities of the mass peaks included in both spectra. If the number of mass peaks to be used for the spectrum matching has been specified by the user, the MRM spectrum comparator 54 extracts, from the standard MRM spectrum in the library data, the mass peaks corresponding to the measurement conditions used in the measurement by the real sample measurement executer 52, reconstructs the MRM spectrum from the extracted mass peaks, and compares it with the measured MRM spectrum.

Figure 13:
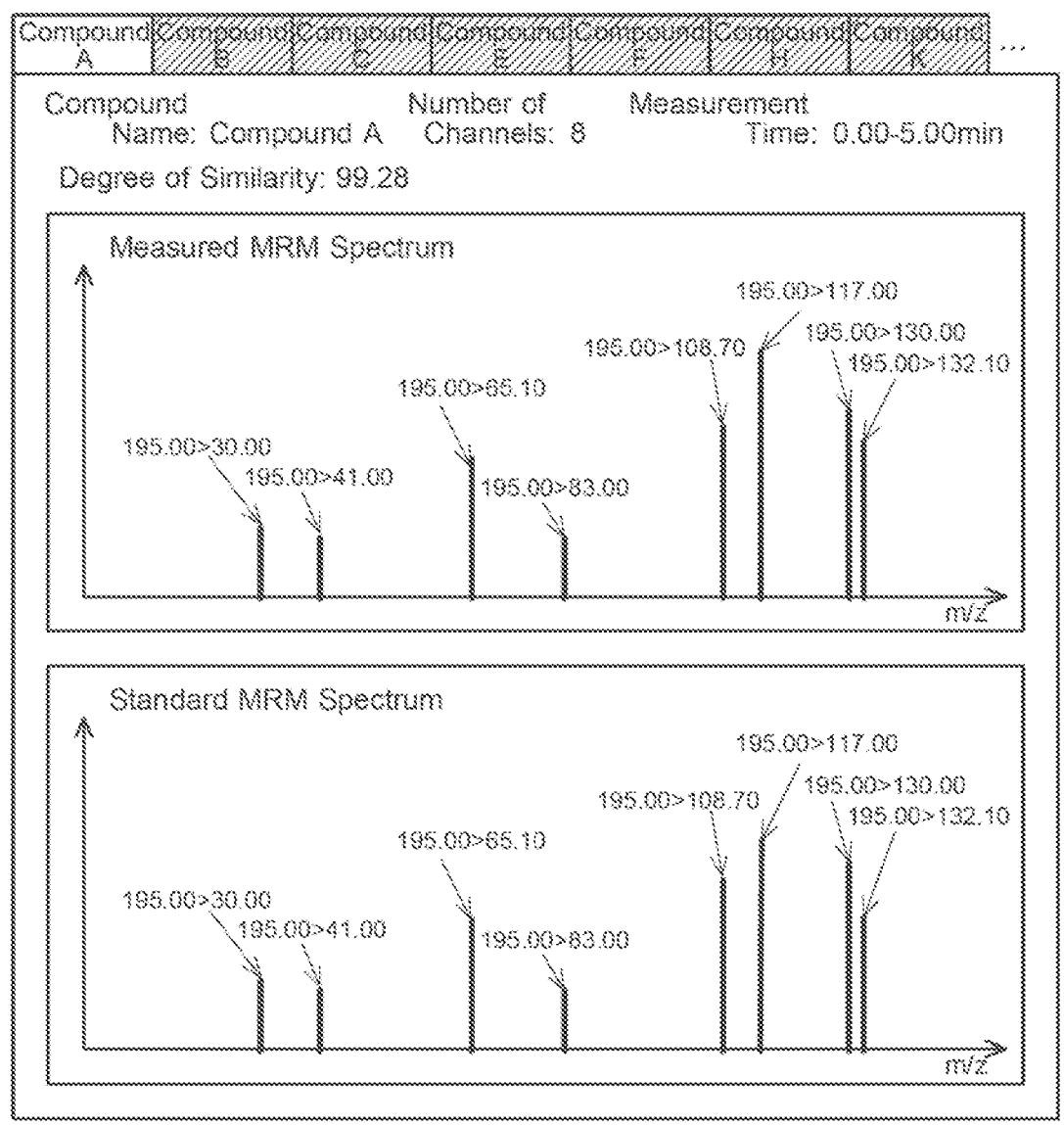
FIG. 13 is an example of the screen display of the result of an analysis of a real sample using the chromatograph mass spectrometer according to the present embodiment.

The calculation of the degree of similarity of the MRM spectra has been completed for all target compounds, the MRM spectrum comparator 54 displays, on the display unit 7, the degree of similarity of each target compound along with the measured and standard MRM spectra (Step S17). FIG. 13 is an example of the display screen. Displaying the measured and standard spectra along with the degree of similarity in this manner allows the user to intuitively understand whether or not the component in the sample is the target compound, based on not only the numerical value of the degree of similarity but also the visual recognition of the entire form or other features of the MRM spectra. The tabs in the upper portion of the screen in FIG. 13 allow the display to be switched to the result of another compound.

The previously described embodiment is a mere example of the present invention and can be appropriately changed in line with the spirit of the present invention. In the previous embodiment, all product ions whose measured intensities exceed the threshold are extracted for the standard sample. This may be modified so that the measurement condition setter 42 in setting the measurement conditions allows the user to input the number of pieces of the MRM spectrum element information for composing an MRM spectrum, and creates the inputted number of pieces of the MRM spectrum element information in descending order of the measured intensity of the product ions. The number of pieces of the MRM spectrum element information, or the number of peaks of the MRM spectrum, should be at least three, and more preferably, between six and sixteen, inclusive. Although the number of pieces of the MRM spectrum element information depends on the molecular weight, molecular structure and other features of the target compound, selecting a number within the aforementioned range enables the screening to be performed using a sufficient number of product ions characteristic of the target compound for comparison with the measured data. It also allows the dwell time to be long enough without causing the cycle time in the actual measurement to be excessively long.

In order that product ions which have high measured intensities yet are not characteristic of the compound concerned will be excluded from the MRM spectrum element information, the user may be allowed to additionally set mass-to-charge ratios of such product ions (excluded ions) when inputting information concerning the target compound in the process of setting the measurement conditions by the measurement condition setter 42, and the product ion extractor 44 may be configured to avoid extracting the excluded ions regardless of the levels of their measured intensities. Furthermore, in order that product ions which have rather low measured intensities yet are characteristic of the compound concerned can be preferentially included in the MRM spectrum element information, the user may be allowed to additionally set mass-to-charge ratios of such product ions (preferred ions) when inputting information concerning the target compound in the process of setting the measurement conditions by the measurement condition setter 42, and the product ion extractor 44 may be configured to always extract the preferred ions regardless of the levels of their measured intensities.

Although a liquid chromatograph mass spectrometer was presented as an example in the previous embodiment, it is not always necessary to use a liquid chromatograph for the creation of the library data; the standard sample may be directly introduced into the ion source of the mass spectrometer. A gas chromatograph may be used in place of the liquid chromatograph. Furthermore, although a triple quadrupole mass spectrometer is presented as an example in the previous embodiment, it is also possible to use a mass spectrometer having a different configuration including a front mass-separating section, fragmenting section and rear mass-separating section.

REFERENCE SIGNS LIST

1 . . . Liquid Chromatograph Unit
12 . . . Injector
13 . . . Column
14 . . . Autosampler
2 . . . Mass Spectrometry Unit
20 . . . Ionization Chamber
201 . . . ESI Probe
21 . . . First Intermediate Vacuum Chamber
22 . . . Second Intermediate Vacuum Chamber
23 . . . Analysis Chamber
231 . . . Front Quadrupole Mass Filter
232 . . . Collision Cell
234 . . . Rear Quadrupole Mass Filter
235 . . . Ion Detector
4 . . . Control Unit
41 . . . Storage Section
411 . . . Compound Table
412 . . . Library Storage Area
42 . . . Measurement Condition Setter
43 . . . Standard Sample Measurement Executer
44 . . . Product Ion Extractor
45 . . . MRM Spectrum Element Information Creator
46 . . . Standard MRM Spectrum Composer
47 . . . Library Data Creator
51 . . . Analysis Target Compound Input Receiver
52 . . . Real Sample Measurement Executer
53 . . . Measured MRM Spectrum Creator 54 . . . MRM Spectrum Comparator
6 . . . Input Unit
7 . . . Display Unit

The invention claimed is:

1. A mass spectrometer capable of performing an MS$^n$ analysis (where n is an integer equal to or greater than two) including a front mass-separating section configured to select, as a precursor ion, an ion having a predetermined mass-to-charge ratio among ions originating from a compound contained in a sample, a fragmenting section configured to fragment the precursor ion selected by the front mass-separating section to generate product ions, and a rear mass-separating section configured to perform mass separation of the product ions generated by the fragmenting section, the mass spectrometer further comprising:
 a measurement condition setter configured to set, in response to an input of an instruction by a user, a plurality of measurement conditions which are different from each other in terms of a set value of at least one measurement parameter that changes a form of fragmentation of the precursor ion in the fragmenting section or that changes a measurement sensitivity for the product ions;
 a measurement executer configured to acquire a plurality of sets of mass spectrometric data respectively corresponding to the plurality of measurement conditions, by performing a measurement of product ions using each of the plurality of measurement conditions, where the measurement includes fragmenting a precursor ion having a predetermined mass-to-charge ratio of the target compound into product ions and performing mass separation of the product ions;
 a product ion extractor configured to extract, from the sets of the mass spectrometric data, a plurality of product ions whose measured intensities exceed a previously determined reference value;
 an MRM spectrum element information creator configured to determine, for each of the plurality of extracted product ions, a mass-to-charge ratio and measured intensity of the product ion, a mass-to-charge ratio of the precursor ion which produced the product ion, as well as the measurement condition under which the measured intensity was acquired, and to create a plurality of pieces of MRM spectrum element information from the plurality of product ions and the measurement conditions respectively determined for the plurality of product ions;
 an MRM spectrum composer configured to compose an MRM spectrum from the mass-to-charge ratios and the measured intensities of the plurality of product ions included in the plurality of pieces of MRM spectrum element information; and
 a library data creator configured to relate the MRM spectrum to information concerning the target compound to create library data for the target compound.

2. The mass spectrometer according to claim 1, wherein the at least one measurement parameter includes a value of a collision energy to be imparted to a precursor ion to be introduced into the fragmenting section.

3. The mass spectrometer according to claim 1, wherein a number of pieces of the MRM spectrum element information is equal to or greater than three.

4. The mass spectrometer according to claim 1, wherein a number of pieces of the MRM spectrum element information is between six and sixteen, inclusive.

5. The mass spectrometer according to claim 1, wherein the pieces of the MRM spectrum element information are placed in order according to the measured intensity of the product ion.

6. The mass spectrometer according to claim 1, wherein:
 the measurement condition setter is further configured to set a number of pieces of the MRM spectrum element information according to an input of an instruction by a user; and
 the MRM spectrum element information creator is configured to create a same number of pieces of the MRM spectrum element information as the number set by the measurement condition setter.

7. The mass spectrometer according to claim 1, wherein:
 the measurement condition setter is further configured to specify an excluded ion based an input of an instruction by a user; and
 the product ion extractor is configured to avoid extracting the excluded ion regardless of a level of the measured intensity of the excluded ion.

8. The mass spectrometer according to claim 1, wherein:
 the measurement condition setter is further configured to specify a preferred ion based an input of an instruction by a user; and
 the product ion extractor is configured to always extract the preferred ion regardless of a level of the measured intensity of the preferred ion.

9. The mass spectrometer according to claim 1, further comprising:
 an analysis target compound input receiver configured to receive an input for selecting one or more compounds to be analyzed from compounds for which the library data is already prepared;
 a real sample measurement executer configured to perform a measurement of a real sample using a plurality of measurement conditions read from each of one or more sets of library data corresponding to the one or more compounds to be analyzed;
 a measured MRM spectrum creator configured to create a measured MRM spectrum from a combination of mass-to-charge ratios and measured intensities of a plurality of product ions acquired through the measurement of the real sample; and
 an MRM spectrum comparator configured to compare the measured MRM spectrum with an MRM spectrum included in the library data, for each of the one or more compounds to be analyzed.

10. The mass spectrometer according to claim 9, wherein:
 the analysis target compound input receiver is further configured to receive an input of a number of mass peaks to be used for comparison of MRM spectra for each of the one or more compounds to be analyzed;
 the real sample measurement executer is configured to perform the measurement of the real sample using the inputted number of measurement conditions for each of the one or more compounds to be analyzed; and
 the measured MRM spectrum comparator is configured to extract, from the MRM spectrum included in the library data, mass peaks corresponding to the measurement conditions used in the measurement, reconstruct the MRM spectrum from the extracted mass peaks, and compare the MRM spectrum with the measured MRM spectrum.

11. The mass spectrometer according to claim 10, wherein, when the number of mass peaks is inputted, the real sample measurement executer performs the measurement of the real sample using the inputted number of measurement conditions in descending order of measured intensity in the MRM spectrum included in the library data, for each of the one or more compounds to be analyzed.

12. A mass spectrometric method using a mass spectrometer including a front mass-separating section configured to select, as a precursor ion, an ion having a predetermined mass-to-charge ratio among ions originating from a compound contained in a sample, a fragmenting section configured to fragment the precursor ion selected by the front mass-separating section to generate product ions, and a rear mass-separating section configured to perform mass separation of the product ions generated by the fragmenting section, the method comprising:

introducing a standard sample containing a known target compound into the mass spectrometer;

setting a plurality of measurement conditions which are different from each other in terms of a set value of at least one measurement parameter that changes a form of fragmentation of the precursor ion in the fragmenting section or that changes a measurement sensitivity for the product ions;

acquiring a plurality of sets of mass spectrometric data respectively corresponding to the plurality of measurement conditions, by performing a measurement of product ions using each of the plurality of measurement conditions, where the measurement includes fragmenting a precursor ion having a predetermined mass-to-charge ratio of the target compound into product ions and performing mass separation of the product ions;

extracting, from the sets of the mass spectrometric data, a plurality of product ions detected with intensities exceeding a previously determined reference value;

determining, for each of the plurality of extracted product ions, a mass-to-charge ratio and measured intensity of the product ion, a mass-to-charge ratio of the precursor ion which produced the product ion, as well as the measurement condition under which the measured intensity was acquired, and creating a plurality of pieces of MRM spectrum element information from the plurality of product ions and the measurement conditions respectively determined for the plurality of product ions;

composing an MRM spectrum from the mass-to-charge ratios and the measured intensities of the plurality of product ions included in the plurality of pieces of MRM spectrum element information; and relating the MRM spectrum to information concerning the target compound to create library data for the target compound.

13. The mass spectrometry method according to claim 12, further comprising:

receiving an input for selecting one or more compounds to be analyzed from compounds for which the library data is already prepared;

performing a measurement of an analysis-target sample using a plurality of measurement conditions read from each of one or more sets of library data corresponding to the one or more compounds to be analyzed;

creating a measured MRM spectrum from a combination of mass-to-charge ratios and measured intensities of a plurality of product ions acquired through the measurement of the analysis-target sample; and comparing the measured MRM spectrum with an MRM spectrum included in the library data, for each of the one or more compounds to be analyzed.

* * * * *